Figure 1:
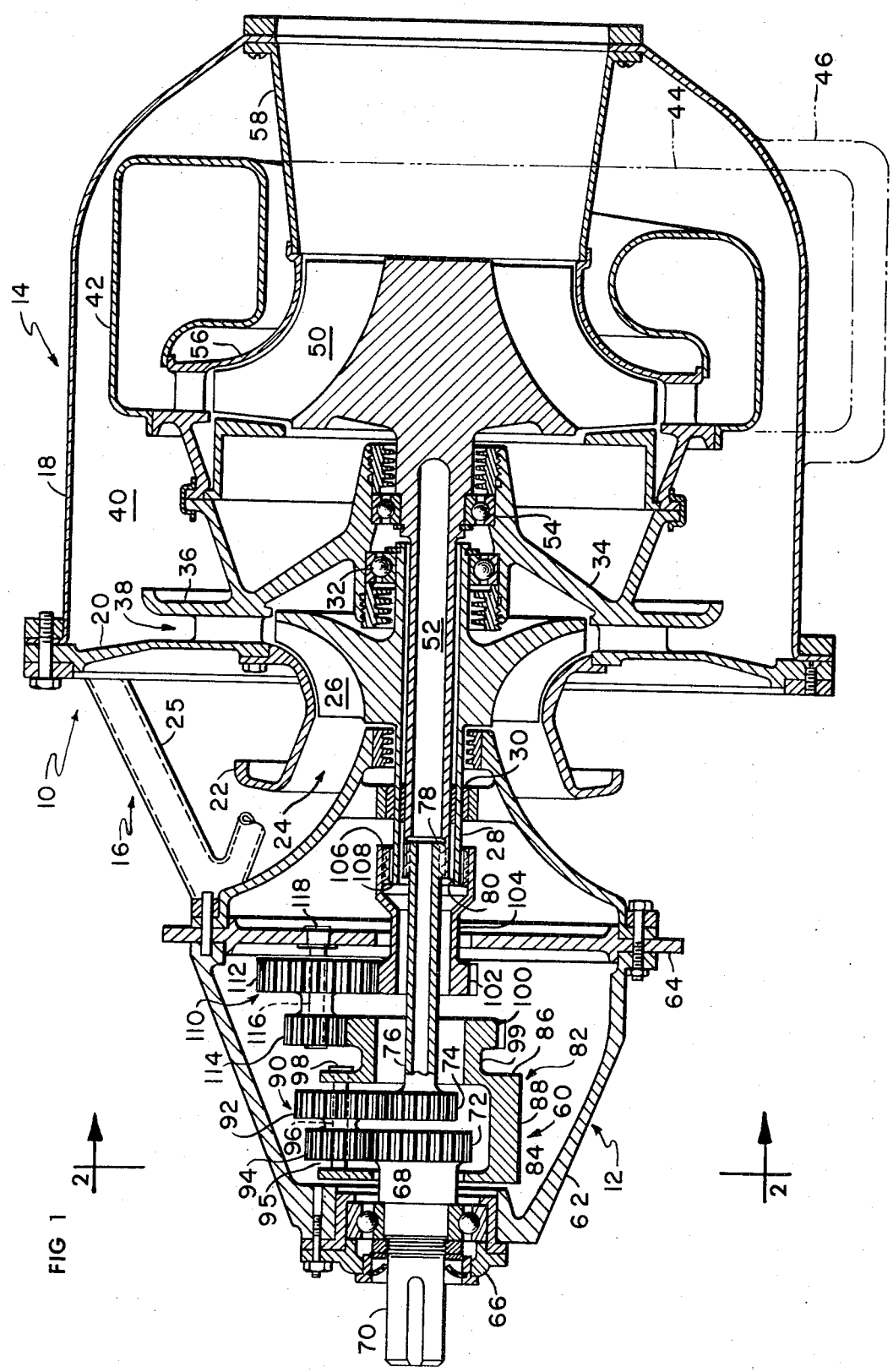

United States Patent [19]

Cronstedt

[11] 3,853,432
[45] Dec. 10, 1974

[54] DIFFERENTIAL GAS TURBINE ENGINE

[75] Inventor: Val Cronstedt, Williamsport, Pa.

[73] Assignee: Avco Corporation, Williamsport, Pa.

[22] Filed: Aug. 29, 1973

[21] Appl. No.: 392,566

[52] U.S. Cl. ............... 417/405, 74/664, 74/682, 60/39.08, 415/122

[51] Int. Cl. ........................................... F04b 17/00

[58] Field of Search ................ 417/405, 407, 409; 415/122; 60/39.08; 74/664, 720.5, 682

[56] References Cited
UNITED STATES PATENTS

| | | | |
|---|---|---|---|
| 2,485,503 | 10/1949 | Misch | 74/682 |
| 3,271,949 | 9/1966 | Jones et al. | 415/122 R |
| 3,505,816 | 4/1970 | Wilde | 415/122 R |
| 3,632,222 | 1/1972 | Cronstedt | 415/122 R |
| 3,667,214 | 6/1972 | Addie | 741/664 |
| 3,761,205 | 9/1973 | Cronstedt | 415/122 R |

Primary Examiner—C. J. Husar
Attorney, Agent, or Firm—Charles M. Hogan; Irwin P. Garfinkle

[57] ABSTRACT

A gas turbine engine including independently rotatable, coaxial centrifugal compressor and centripetal turbine connected to a power output shaft through a differential gear arrangement. The differential uses exclusively external spur gears greatly to simplify manufacture and improve efficiency.

9 Claims, 2 Drawing Figures

DIFFERENTIAL GAS TURBINE ENGINE

It has been proposed to couple the compressor and turbine shafts of a gas turbine engine to a power output shaft through a differential gear set. This was shown in the patent to D. W. Hutchinson, U.S. Pat. No. 2,693,080, entitled "Differential Gas Turbine." The advantages of such an engine are that the compressor can operate at its optimum speed while the speed of the turbine can be varied to produce the required output torque for any of selected output shaft speeds. This arrangement approaches the flexibility in operation of free power turbine engines without the substantial additional cost of separate power turbine stages with additional housings and bearings.

Although this type of engine eliminates the need for a separate power turbine, certain applications, such as in vehicles and helicopters, make it necessary to provide the differential gearing arrangement between the compressor and the turbine. One of the problems with gearing arrangements that have been proposed for the differential gas turbine engines is that they incorporate internal facing or bevel gears which are difficult and expensive to form with adequate accuracy, thus substantially decreasing the potential cost saving in the engine.

These problems are eliminated by a gas turbine engine having independently rotatable coaxial compressor and turbine rotors commonly journaled in an annular housing. Two two-stage planetary gear sets are employed: one to reduce the turbine speed to a usable industrial output speed and another two-stage planetary gear set to increase speed of the planet carrier of the first set to a suitable compressor rotating speed. The differential action between the two sets is obtained by the planet carrier of the first-named planetary gear set is directly connected to the sun gear of the second (compressor) set. A sun gear is connected to the turbine shaft and an adjacent output gear is connected to an output shaft. An annular planet carrier is positioned around the sun and output gears and a first set of planet gear assemblies in the carrier engage the sun input and sun output gears. A ring gear having external teeth is positioned on the planet carrier and a drive sun gear is mounted on the compressor shaft adjacent the ring gear. A second set of gear assemblies journaled about fixed axes relative to the housing engage the ring gear and the compressor drive gear.

The above and other related features of the present invention will be apparent from a reading of the following description of the disclosure shown in the accompanying drawings and the novelty thereof pointed out in the appended claims.

Figure 2:
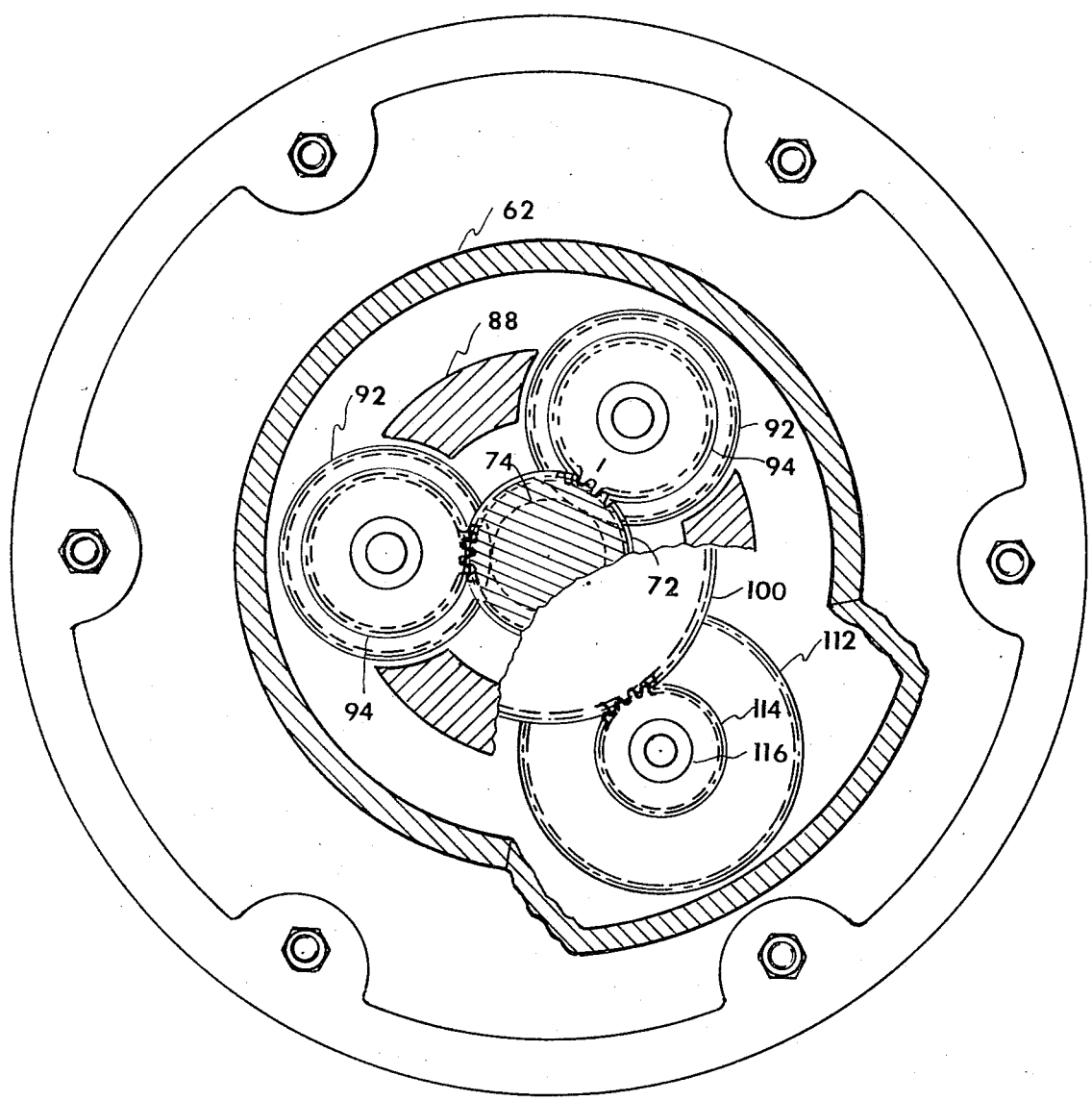

FIG. 1 is a longitudinal section view of a gas turbine engine embodying the present invention; and FIG. 2 is an enlarged cross-sectional view of the gas turbine engine of FIG. 1 taken on line 2—2 of FIG. 1.

FIG. 1 shows a gas turbine engine 10 comprising a gear box module 12 and a power producing module 14 interconnected by a frame structure 16. The general engine arrangement shown in the drawing is similar to the one shown in copending patent application Ser. No. 236,031, filed Mar. 20, 1972, entitled "Easily Maintainable Gas Turbine Engine," Val Cronstedt inventor, and of common assignment with the present invention now U.S. Pat. No. 3,761,205. For purposes of the present invention the structure of the power module 14 and frame 16 will be described below in a brief fashion.

The power module 14 comprises an annular pressure casing 18 connected to a main support element 20 by suitable attachment devices, as pointed out in the above application. The inner diameter of the flange 20 has secured to it an annular bell mouth 22 forming an inlet 24 for air which enters a centrifugal compressor 26 past frame struts 25. Compressor 26 is integral with a tubular compressor shaft 28 journaled for rotation by bearings 30 and 32, respectively. Bearing 32 is supported by an annular bearing support frame assembly 34 extending to a back wall 36 of a diffuser 38 which receives air from compressor 26.

The interior of housing 18 forms a pressurized air chamber 40 in which a turbine inlet duct 42 is positioned. The scroll-formed turbine inlet duct receives a hot gas stream from a suitable combustor, herein shown in phantom as a tangential combustor 44 exposed to pressurized air of chamber 40 through the use of a suitable dome 46. It should be apparent that other forms of combustors may be used in this engine with suitable modifications. As is well known in the art, the combustor 44 is perforated to permit entry of pressurized air from chamber 40 and has provision for the injection of a metered amount of fuel to be mixed with the air. The resultant mixture in the combustor 44 is ignited and the hot gas stream discharged into the turbine inlet duct 42 for discharge through an inwardly directed annular outlet 48 across a turbine inlet nozzle 46 and directed tangentially to a centripetal turbine 50.

Turbine 50 is integral with a turbine shaft 52 extending through and coaxial with tubular compressor shaft 28. Shaft 52 is journaled for rotation by bearing assembly 54 secured to bearing support assembly 34. An annular turbine shroud 56 and exhaust duct 58 connected to the aft end of housing 18 provide a path for the exhaust gas stream to the atmosphere.

As shown in FIGS. 1 and 2, both the compressor and turbine shafts 28 and 52 extend forward for connection to a differential gearing arrangement 60 positioned within the gear box module 12. The gear box module 12 has an annular outer housing 62 secured at its aft end to a support disk 64, in turn secured to struts 25. A bearing cap 66 containing a bearing assembly 68, used to journal an output shaft 70, is secured to the forward end of housing 62.

Output shaft 70 has at its aft end an output gear 72 in the form of a gear with external teeth. Adjacent to the output gear 72 and coaxial with it is a turbine sun gear 74 also in the form of a gear with external teeth. Turbine sun gear 74 is integral with a connecting shaft 76 having external splines 78 at its aft end which interconnect with internal splines 80 on turbine shaft 52.

A rotatable annular planet carrier 88 is positioned around the output gear 72 and turbine sun gear 74 and is coaxial with these gears. The annular carrier 88 is shown as an integral assembly having a forward annular wall 84 and aft annular wall 86 interconnected by strut members. A first gear train consisting of a set of gear assemblies 90 is journaled in annular carrier 88. Preferably, there are three or more such assemblies spaced equally apart around the circumference of the annular carrier 88. They will equalize the gear loads and thus eliminate the need for bearings to journal the annular carrier 88 and turbine sun gear 74.

Each gear assembly 90 in the set comprises a first gear 92 in the form of a gear having external teeth for engaging the turbine sun gear 74. A second gear 94 integral with the first gear 92 is also in the form of a spur gear with external teeth and engages the output gear 72. Gears 92 and 94 extend through suitable openings 95 in planet carrier 88. Each gear assembly 90 has an internal longitudinal bore 96 telescoped over a support shaft 98 which is suitably attached to end walls 84 and 86 of the planetary carrier 88. Gear assembly 90 would, in practice, have a suitable bearing arrangement between the support shaft 98 and the bore 96. However, this bearing arrangement is omitted to simplify the explanation of the invention. The number of teeth in the output gear 72, gears 94 and 92, are selected to provide a predetermined speed-reducing ratio between turbine sun gear 92 and the output shaft 70.

The planet carrier 88 has at its aft end an integral sleeve 99, including a ring gear 100 in the form of a spur gear having external teeth. Adjacent to the ring gear 100 is a compressor sun drive gear 102 also in the form of a spur gear with external teeth. Compressor drive gear 102 is integral with a tubular connecting element 104 having internal splines 106 which connect with external splines 108 on the forward end of compressor shaft 28. A second gear train consisting of a set of gear assemblies 110 are positioned to engage the ring and compressor drive gears 100 and 102. As in the case of the set of planetary gear assemblies 90, there are three such assemblies positioned 120° apart relative to the axes of the ring gear 100 and compressor drive sun gear 102.

Each gear assembly 110 in the set comprises a first gear 112 in the form of a spur gear having external teeth for engaging a compressor drive sun gear 102. A second gear 114 integral with gear 112, also in the form of a spur gear having external teeth, engages ring gear 100. Each gear assembly 110 has a longitudinal bore 116 telescoped over a support shaft 118 suitably cantilever supported in the structural stationary disk 64. As with the orbiting gear assemblies 90, the usual bearing assembly between the bore 112 and the shaft 118 has been omitted to simplify the description. The number of teeth in the ring gear 100, gears 112 and 116 and the compressor drive gear 102, are selected to provide a predetermined speed-increasing ratio between ring gear 110 (carrier 88) and compressor drive gear 102, as described below.

During operation of the gas turbine engine described above the hot gas stream generated in the combustor 44 is discharged across the turbine wheel 50 to drive the turbine shaft in a first direction. The input from the shaft via the sun gear 74 is split into two outputs, namely, the compressor drive gear 102 and the output gear 72. The torque relationships in the gear set are such that the input torque from sun gear 74 equals the output torque supplied to gear 102 and output gear 72. Depending upon the torque restraints placed on the gears 72 and 102, their speeds will change to maintain this torque balance. In the usual differential gas turbine engine it is desired to maintain the rotational speed of the compressor at a given optimum value. To accomplish this, the fuel is metered to the combustor to vary the r.p.m. of the turbine shaft, depending upon the torque restraints placed on the output shaft 70 to produce the optimum r.p.m. for the compressor.

The compressor and turbine for a small gas turbine engine, such as the one illustrated, operate at a high speed. In order to bring the speed of shaft 70 to a usable level, such as approximately 0 to 6,000 r.p.m., it is necessary to have an effective speed-reducing ratio in the differential gear mechanism 60. Because of the unique arrangement of the differential gears illustrated, this speed reduction ratio is easily attainable with a gearing arrangement utilizing a minimum of radial and axial space at a high efficiency.

The above differential gearing arrangement is highly simplified, self-balancing and is inherently economical to manufacture. It is noted that all of the gears in the gear box have external teeth and are preferably spur gears. These are very easy to manufacture and do not require the complicated and expensive techniques associated with the formation of gears with internal or conical teeth. Alternatively, they may be helical gears with the helix angles so proportioned in respect to the mesh torque transmitted that there is no external axial force vector remaining. The self force balancing feature of the gearing minimizes the number of bearings required and thus further reduces the cost of producing the differential and improves its efficiency.

While a preferred embodiment of the present invention has been illustrated, it should be apparent to those skilled in the art that it may be modified other than expressly shown and still come within its spirit and scope.

Having thus described the invention, what is claimed as novel and desired to be secured by Letters Patent of the United States is:

1. A gas turbine engine comprising:
   a generally annular housing;
   independent rotatable and coaxial compressor and turbine rotors journaled in said housing;
   an input sun gear connected to said turbine shaft;
   a power output shaft journaled in said housing and having an output sun gear having external teeth secured thereto, said output gear being adjacent said input sun gear;
   a generally annular planet carrier positioned around said sun gear;
   a first gear train consisting of a set of planet gear assemblies having external teeth rotatably mounted in said carrier, each planet gear assembly comprising a first gear engaging said sun input gear and a second gear engaging said output sun sun gear, both gears connected to permit the transfer of torque from one to the other;
   a ring gear on said planet carrier, said ring gear having external teeth;
   a drive input sun gear mounted on said compressor shaft and having external teeth, said compressor shaft being adjacent said ring gear; and
   a second gear train consisting of a set of gear assemblies having external teeth and journaled about axes fixed relative to said housing, each assembly having a first gear engaging said compressor drive sun gear and a second gear engaging said ring gear, both gears connected to permit the transfer of torque from one to the other.

2. A gas turbine engine as in claim 1 wherein said set of planet gear assemblies in said first gear train comprises three assemblies equally spaced with respect to one another thereby eliminating the need for rotatable journaling of said carrier and sun gear.

3. A gas turbine engine as in claim 2 wherein said set of planet gear assemblies in said first gear train are journaled over a shaft extending through the gear assemblies and supported at both ends in said carrier.

4. A gas turbine engine as in claim 3 further comprising a shaft fixed to said housing and extending through each one of the set of gear assemblies in said second gear train for the rotatable journaling thereof.

5. A gas turbine engine as in claim 1 wherein said carrier is a unit structure having said ring gear integrally formed with one end thereof.

6. A gas turbine engine as in claim 1 wherein:
the number of teeth of the first and second gears of said set of planet gear assemblies in said first gear train are selected to provide a predetermined speed-reducing ratio between said first gear and said output gear;
the number of teeth on the first and second gears of said set of gear assemblies in said second gear train are selected to provide a predetermined speed-increasing ratio between said ring gear and said compressor input gear.

7. A gas turbine engine as in claim 6 having three planet gear assemblies in said first gear train equally spaced from one another and wherein said gas turbine engine further comprises shafts secured at their ends to said annular carrier, said planet gear assemblies in said first gear set being journaled over said shafts.

8. A gas turbine engine as in claim 7 having three planet gear assemblies in said second gear train and wherein said engine further comprises shafts about which said gear assemblies in the second gear train are journaled, one end of said shafts being fixed to said housing.

9. A gas turbine engine as in claim 8 wherein said carrier is a unit structure having said ring gear integral with one end thereof.

* * * * *